United States Patent
Gusakov et al.

(10) Patent No.: US 9,558,158 B2
(45) Date of Patent: Jan. 31, 2017

(54) AUTOMATED DOCUMENT TRANSLATION

(71) Applicant: Translation Management Systems, Ltd, Moscow (RU)

(72) Inventors: Vladimir Gusakov, Moscow (RU); Jean-Luc Dominique Sailard, Cherry Hill, NJ (US); Ivan Smolnikov, Moscow Region (RU); Artem Ukrainets, Moscow (RU)

(73) Assignee: TRANSLATION MANAGEMENT SYSTEMS, LTD, Moscow (RU)

( * ) Notice: Subject to any disclaimer, the term of this patent is extended or adjusted under 35 U.S.C. 154(b) by 0 days.

(21) Appl. No.: 14/812,142

(22) Filed: Jul. 29, 2015

(65) Prior Publication Data
US 2016/0259760 A1    Sep. 8, 2016

Related U.S. Application Data (60) Provisional application No. 62/129,220, filed on Mar. 6, 2015.

(51) Int. Cl.
*G06F 17/20* (2006.01)

(52) U.S. Cl.
CPC .................. *G06F 17/20* (2013.01)

(58) Field of Classification Search
CPC ........................................... G06F 17/20
USPC .............................................. 704/1, 2, 5, 8
See application file for complete search history.

(56) References Cited

U.S. PATENT DOCUMENTS

| | | |
|---|---|---|
| 5,175,684 A | 12/1992 | Chong |
| 5,812,818 A | 9/1998 | Adler et al. |
| 6,278,969 B1 | 8/2001 | King et al. |
| 6,396,951 B1 | 5/2002 | Grefenstette |
| 7,983,897 B2 | 7/2011 | Chin et al. |
| 8,423,346 B2 | 4/2013 | Seo et al. |
| 8,438,004 B2 | 5/2013 | Carter |
| 8,508,787 B2 | 8/2013 | Minhas |
| 2003/0115552 A1* | 6/2003 | Jahnke ................. G06F 9/4448 715/201 |
| 2004/0260532 A1 | 12/2004 | Richardson et al. |
| 2005/0122537 A1 | 6/2005 | Shin et al. |
| 2005/0197825 A1 | 9/2005 | Hagerman et al. |
| 2005/0221856 A1 | 10/2005 | Hirano et al. |
| 2006/0245005 A1 | 11/2006 | Hall et al. |
| 2008/0249760 A1 | 10/2008 | Marcu et al. |
| 2010/0128994 A1 | 5/2010 | Zwolinski |

(Continued)

FOREIGN PATENT DOCUMENTS

WO    WO2008101299 A1    8/2008

*Primary Examiner* — Marcellus Augustin
(74) *Attorney, Agent, or Firm* — Lowenstein Sandler LLP (57) ABSTRACT

Systems and methods for automated document translation. An example method comprises: scanning an image of an original document using a scanner of a multi-function device; performing, by a processor, optical character recognition of the image to retrieve a text of the original document, wherein the text comprises at least a portion expressed in a source natural language; responsive to receiving a user input specifying a translation method, producing a translated document by causing the portion of the text to be translated into a target natural language using the translation method, wherein the translation method is provided by one of: a machine translation or a human translation; and printing the translated document using a printer of the multi-function device.

23 Claims, 7 Drawing Sheets

(56) References Cited

U.S. PATENT DOCUMENTS

| | | | |
|---|---|---|---|
| 2011/0082684 A1* | 4/2011 | Soricut | G06F 17/289 704/2 |
| 2011/0122448 A1* | 5/2011 | Minhas | G06F 17/2288 358/1.18 |
| 2012/0240039 A1* | 9/2012 | Walker | G06Q 10/10 715/265 |
| 2013/0054222 A1 | 2/2013 | Sharma | |
| 2014/0149102 A1 | 5/2014 | Marcu et al. | |

* cited by examiner

AUTOMATED DOCUMENT TRANSLATION

CROSS-REFERENCE TO RELATED APPLICATION

This application is related to and claims the benefit of U.S. Patent Application No. 62/129,220, filed Mar. 6, 2015, the entirety of which is incorporated herein by reference.

TECHNICAL FIELD

The present disclosure is generally related to computer systems, and is more specifically related to systems and methods for automated translation of electronic documents from one or more source natural language to one or more target natural languages.

BACKGROUND

Language translation computer programs perform reasonably well for formal content in well-studied languages (e.g., English, French, Spanish, German, and others). However, for other language, as well as informal or subject area-specific content, a user has often resort to human translation and hence bear the associated costs.

SUMMARY OF THE DISCLOSURE

In accordance with one or more aspects of the present disclosure, an example method for automated document translation may comprise: scanning an image of an original document using a scanner of a multi-function device; performing, by a processor, optical character recognition of the image to retrieve a text of the original document, wherein the text comprises at least a portion expressed in a source natural language; responsive to receiving a user input specifying a translation method, producing a translated document by causing the portion of the text to be translated into a target natural language using the translation method, wherein the translation method is provided by one of: a machine translation or a human translation; and printing the translated document using a printer of the multi-function device.

In accordance with one or more aspects of the present disclosure, another example method for automated document translation may comprise: scanning an image of an original document; performing, by a processor, optical character recognition of the image to retrieve a text of the original document; identifying, within the text, a first portion expressed in a source natural language, wherein the first portion matches a first stored translation record associating the first portion and a first translated text expressed in a target natural language; translating the first portion into the target natural language using the first translated text; responsive to failing to match a second portion of the text to a second stored translation record, causing the second portion of the text to be translated into the target natural language using a translation method provided by one of: a machine translation or a human translation.

In accordance with one or more aspects of the present disclosure, yet another example method for automated document translation may comprise: identifying an account to be associated with a current translation job; scanning an image of an original document; performing, by a processor, optical character recognition of the image to retrieve a text of the original document; responsive to successfully verifying an entitlement of the account to order the current translation job comprising translation of at least portion of the text of the original document to a target natural language, causing at least the portion of the text to be translated into a target natural language using a translation method provided by one of: a machine translation or a human translation.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for automated document translation from one or more source natural language to one or more target natural languages.

"Computer system" herein shall refer to a data processing device having a general purpose processor, a memory, and at least one communication interface. In accordance with one or more aspects of the present disclosure, a computer system may be programmed to perform various methods for translating documents and media content (e.g., audio and/or video files) from one or more source natural languages to one or more target natural languages. In numerous illustrative examples, such a computer system may be provided by various computing devices including a tablet computer, a smart phone, a notebook computer, a desktop computer, a multi-function device (MFD), or a cloud-based server. An MFD may comprise a document scanner, a document printer, a processor, a memory, various other peripheral devices and/or auxiliary circuitry.

In certain implementations, a computer system operating in accordance with one or more aspects of the present disclosure may implement a "scan-and-translate" operational scenario with the user-selectable translation method.

The computer system (e.g., represented by an MFD) may acquire an image of a paper document that may comprise one or more pages. Responsive to acquiring the document image, the computer system may perform optical character recognition (OCR) of the image to produce the text and the metadata associated with the scanned document. The computer system may comprise a user interface employed to receive a user input selecting the desired translation method for the scanned document (e.g., machine translation or human translation) and/or desired one or more target languages. In an illustrative example, the user interface element may be provided by two or more push buttons corresponding to two or more translation methods. Alternatively, the user interface element may be provided by a single push button toggling between a sequence of two or more translation methods. Alternatively, the user interface element may be provided by a radio button rendered by a graphical user interface (GUI) screen which may optionally be equipped with a touch-sensitive input device. Responsive to receiving the user input selecting the translation method, the computer system may cause the document to be translated into one or more target natural languages using the user-specified translation method. The target natural languages may be selected via a user and/or administrative interfaces of the computer system for the document that is currently being processed or for a plurality of documents grouped based on one or more document attributes, account attributes, etc.

Responsive to receiving the user's selection of the machine translation method, the computer system may cause the document to be translated into the specified target natural languages using the machine translation method, including customized machine translation engines (e.g., by a translation program module which may be running locally on the computer system and/or by communicating, over wired and/or wireless connections, with one or more remote computer systems, such as cloud servers and/or servers residing on the local network). Responsive to receiving the translated text of the document, the computer system may print the text using its document printer. Before printing, the computer system may optionally format the translated text using the structure and/or formatting of the originally scanned document.

Alternatively, responsive to receiving the user's selection of the human translation method, the computer system may cause the document to be translated into the specified target natural languages using the human translation method (e.g., by transmitting the document text and/or document image, over wired and/or wireless connections, to one or more computer systems, such as cloud servers and/or servers residing on the local network, that are associated with a human translation service). The computer system may notify the translation service of the work product delivery method, as such transmitting the translated document, over a Single Mail Transfer Protocol (SMTP) relay, to an e-mail address associated with the user, and/or transmitting the translated document back to the initiator computer system over the network. Responsive to receiving the translated text of the document, the computer system may print the text using its document printer.

In certain implementations, a computer system operating in accordance with one or more aspects of the present disclosure may implement a "scan-and-translate" operational scenario using a hybrid translation method that employs a "translation memory" database for storing a plurality of previously translated documents. The computer system (e.g., represented by an MFD) may acquire an image of a paper document that may comprise one or more pages. Responsive to acquiring the document image, the computer system may perform optical character recognition of the image to produce the text and the metadata associated with the scanned document. The computer system may then identify, within the document text, one or more text portions that match source text fields of one or more translation memory database records and glossary records. Each identified text portion may then be translated into the specified target natural language automatically, by using the contents of the field corresponding to the target language within the same translation memory database record or glossary record as the original text portion. Responsive to failing to match one or more remaining portions of the original document text to any translation memory database records or glossary records, the computer system may cause the remaining document portions to be translated into one or more target natural languages using a user-specified translation method (e.g., machine translation or human translation).

In certain implementations, a computer system operating in accordance with one or more aspects of the present disclosure may verify the entitlement of a certain account (e.g., an account associated with a user, a project, or an organization) to order a translation of the scanned document. In an illustrative example, the computer system (e.g., represented by an MFD) may acquire an image of a paper document that may comprise one or more pages. Responsive to acquiring the document image, the computer system may perform optical character recognition of the image to produce the text and the metadata associated with the scanned document. The computer system may then identify one or more target natural languages for performing the document translation. The target natural languages may be selected via a user and/or administrative interfaces of the computer system for the document that is currently being processed or for a plurality of documents grouped based on one or more document attributes, account attributes, etc. The computer system may then identify one or more translation methods to be employed for translating the document. The translation methods may be selected via a user and/or administrative interfaces of the computer system for the document that is currently being processed or for a plurality of documents grouped based on one or more document attributes, account attributes, etc. Responsive to identifying certain parameters of the translation job involving the currently scanned document (such parameters including the document size, the source language, the target language, and the translation method), the computer system may verify the user's entitlement to order the translation job. In an illustrative example, the computer system may compare one or more translation job parameters (e.g., document size and the source-target language pair) to a user's entitlement record stored in an entitlement database. In another illustrative example, the computer system may estimate the price of the translation job and compare the estimated price with the account balance. Responsive to successfully verifying the user's entitlement to order the translation job, the computer system may cause the document to be translated into one or more target natural languages using the user-specified translation method. In certain implementations, the computer system may further generate a billing record reflecting the translation job upon the successful completion of the translation job.

Various aspects of the above referenced methods and systems are described in details herein below by way of examples, rather than by way of limitation.

Figure 1:
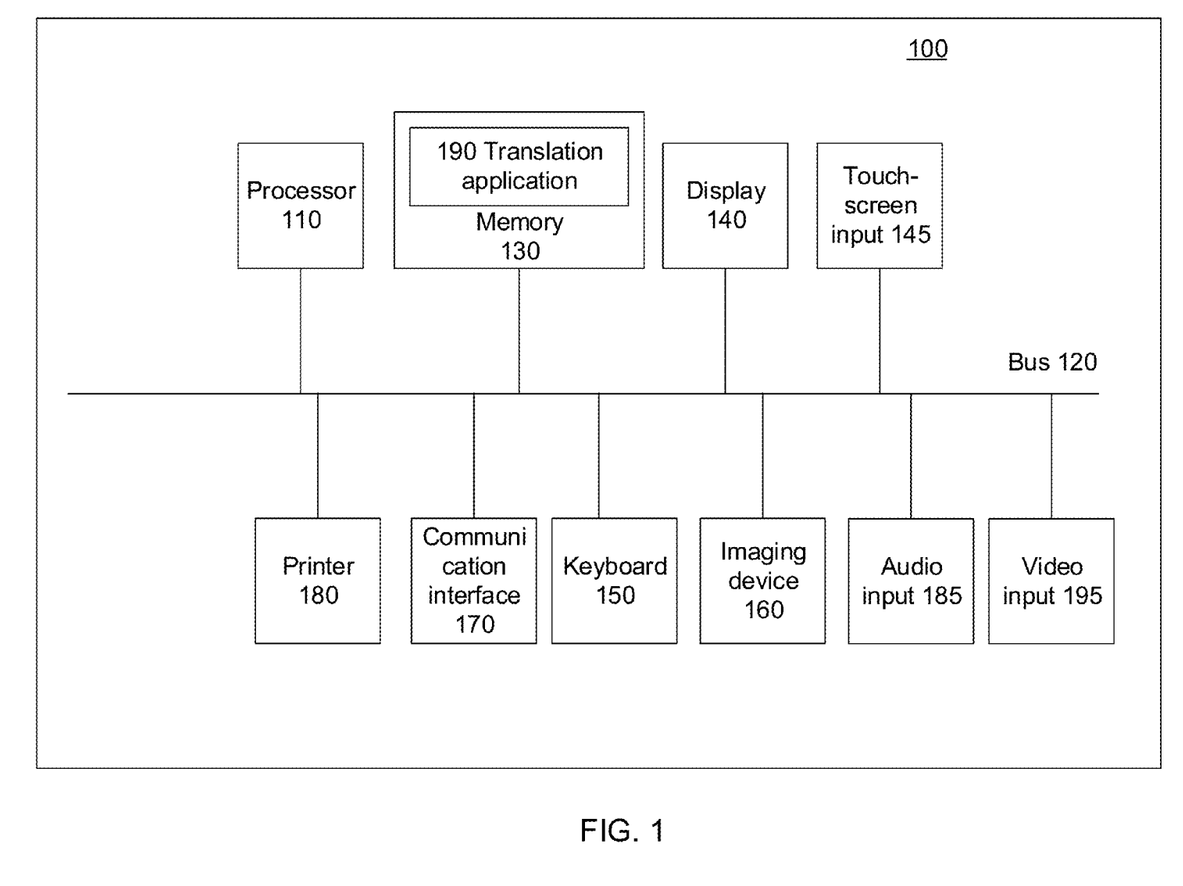
FIG. 1 depicts a block diagram of one embodiment of a computer system operating in accordance with one or more aspects of the present disclosure.

FIG. 1 depicts a block diagram of one illustrative example of a computer system 100 operating in accordance with one or more aspects of the present disclosure. In illustrative examples, computer system 100 may be provided by various computer systems including a tablet computer, a smart phone, a notebook computer, a desktop computer, a multi-function device (MFD), or a cloud-based server.

Computer system 100 may comprise a processor 110 coupled to a system bus 120. Other devices coupled to system bus 120 may include a memory 130, a display 140, a keyboard 150, an imaging device 160, and one or more communication interfaces 170. The term "coupled" herein shall refer to being electrically connected and/or communicatively coupled via one or more interface devices, adapters and the like. In certain implementations, where computer system 100 is provided by an MFD, it may further comprise a document printer 180.

In various illustrative examples, processor 110 may be provided by one or more processing devices, such as general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks). Imaging device 160 may be provided by a scanner or a still image camera configured to acquire the light reflected by the objects situated within its field of view.

In certain implementations, where computer system 100 is provided by a mobile computing device (such as a smartphone or a tablet computer), computer system 100 may further comprise an audio input device 185 (such as a microphone that may be employed to acquire an audio stream) and/or a video input device 195 (such as a video camera that may be employed to acquire a video stream comprising a sequence of video frames).

Computer system 100 may comprise various user interface devices, such as a display 140. In certain implementations, computer system 100 may further comprise a touch screen input device 145 be represented by a touch-sensitive input area and/or presence-sensitive surface overlaid over display 140.

Computer system 100 may comprise various user interface devices, such as a keyboard 150. In certain implementations, keyboard 150 may comprise an alphanumeric keyboard and/or a functional keyboard. The latter may comprise one or more functional keys bearing generic or function-specific labels.

In certain implementations, computer system 100 may comprise a user interface employed to receive a user input selecting the desired translation method (e.g., machine translation or human translation). In an illustrative example, the user interface element may be provided by two or more push buttons of keyboard 150, such that each button corresponds to a certain translation methods. Alternatively, the user interface element may be provided by a single push button of keyboard 150, such that each button pressed event selects the next translation method from a sequence of two or more translation methods. Alternatively, the user interface element may be provided by a radio button rendered by a graphical user interface (GUI) screen 140 which may optionally be equipped with a touch-sensitive input device 145. The translation method selection buttons of keyboard 150 may bear generic or function-specific labels.

In certain implementations, input/output I/O capabilities of computer system 100 may be implemented by a web client that may be executed by computer system 100 and/or by a remote computer system that may access computer system 100 over a network connection.

In certain implementations, where computer system 100 is provided by a mobile computing device (such as a smartphone or a tablet computer), I/O capabilities of computer system 100 may be implemented by a mobile application which may be employed for acquiring document images and/or submitting documents for translation.

In certain implementations, one or more methods described herein may be at least partially implemented by hardware, firmware, software, or any combination thereof. Memory 130 may store instructions of software application 190 for performing one or more methods described herein. In an illustrative example, software application 190 may be implemented as a function to be invoked via a user interface of another application. Alternatively, software application 190 may be implemented as a standalone application.

Computer system 100 may communicate with one or more remote computer systems via one or more communication interfaces 170. Such communication interfaces may comprise one or more wireless network interfaces (including Bluetooth, WiFi, and/or cellular data communication interfaces) and/or wired network interfaces (e.g., Ethernet). Computer system 100 may communicate with one or more remote servers (e.g., representing various translation services) and/or one or more remote clients (e.g., web and/or mobile clients). In certain implementations, computer system 100 may communicate with one or more servers and/or clients via one or more client-side or server-side proxy programs or devices.

A more detailed example of a computer system implementing aspects of the present disclosure will be discussed in more detail below with reference to FIG. 7.

Figure 2:
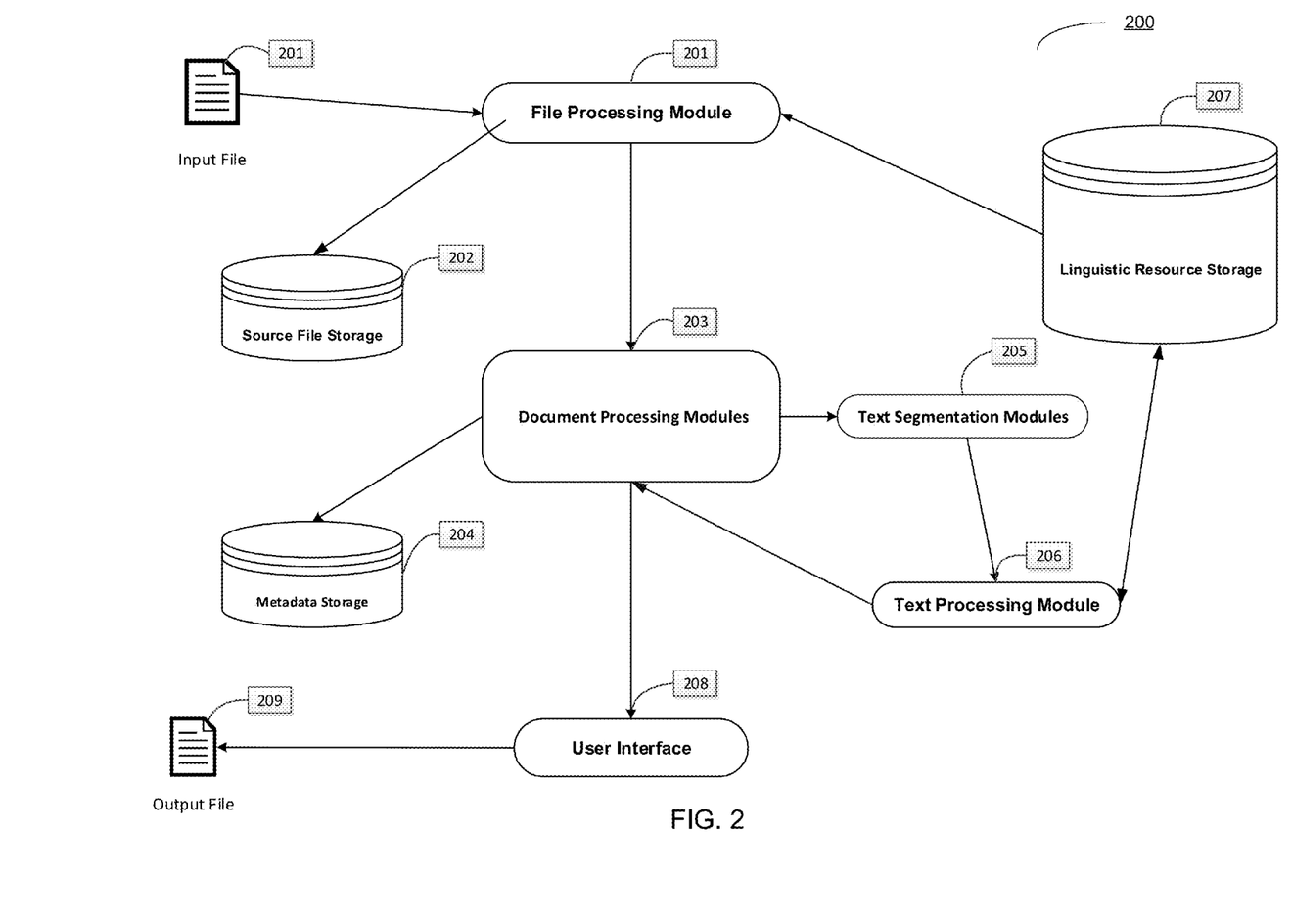
FIG. 2 schematically illustrates an example functional diagram of a document translation system operating in accordance with one or more aspects of the present disclosure.

FIG. 2 schematically illustrates an example functional diagram of a document translation system 200 operating in accordance with one or more aspects of the present disclosure. In certain implementations, document translation system 200 may comprise one or more computer system 100 of FIG. 1.

As schematically illustrated by FIG. 2, system 200 may comprise a file processing module 201, a data storage 202, one or more document processing modules 203, metadata storage 204, one or more text segmentation modules 205, a text processing module 206, a linguistic resource storage 207, and a user interface 208. Functional module structure represented by FIG. 2 is intended for illustrative purposes only, while in various implementations the functions corresponding to one or more functional modules of FIG. 2 may be implemented by one or more software modules, one or more firmware modules, one or more hardware devices or any combination thereof.

Responsive to receiving an input document 100, file processing module 101 may store the received file in source file Storage 202 and pre-process the file based on the file format. For example, document image files may be pre-processed by performing optical character recognition, while video or audio stream files may be pre-processed by performing voice recognition.

Document pre-processing module 203 receives the pre-processed file and extracts the document text and document metadata reflecting the structure and the formatting of the document. The document metadata, in the form of one or more metadata tags, is stored in metadata storage 204.

The text is then sent to text segmentation module 205, which splits the text into one or more text segments for further translation. Responsive to receiving each text segment, text processing module 206 may perform one or more of following actions: provide the user with the source text verification interface for reviewing the initial processing (OCR/text recognition) results, launch a machine translation process using an internal or external (cloud) machine translation engine, launch a human translation workflow, launch a post-translation review and editing user interface, etc.

Linguistic resource storage 207 may be employed by one or more functional modules 201-206 for text pre-processing and translation, e.g., for machine translation using a translation memory database and/or one or more glossaries. In certain implementations, the system for automated document translation operating in accordance with one or more aspects of the present disclosure may select one or more translation memory databases and/or one or more glossaries to be employed for translating a particular document based on certain document and/or user attributes. In an illustrative example, one or more translation memory databases and/or one or more glossaries may be selected based on the user identity. In another illustrative example, one or more translation memory databases and/or one or more glossaries may be selected based on the document subject. In another illustrative example, one or more translation memory databases and/or one or more glossaries may be selected based on one or more keywords comprised by the document. In another illustrative example, one or more translation memory databases and/or one or more glossaries may be selected based on one or more metadata tags.

The translated text may be processed by document processing module 203 to produce output file 209 by assembling multiple translated fragments and applying the structure and formatting of source document 201. Output file may be presented via user interface 208 and/or sent to the user's e-mail address.

Figure 3:
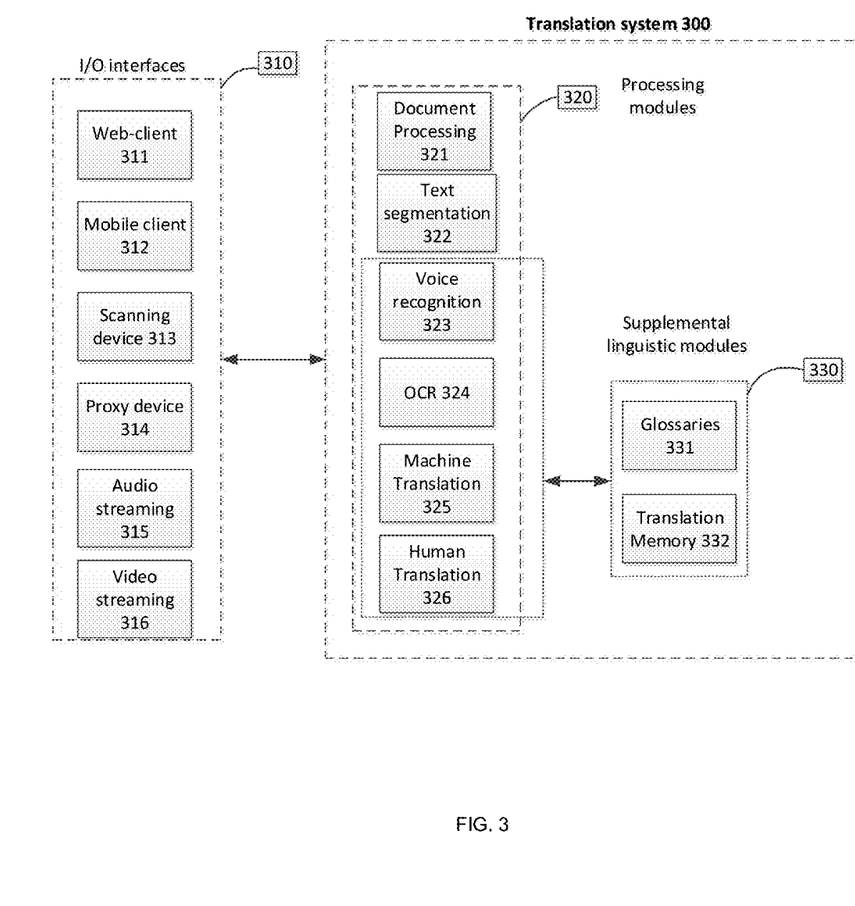
FIG. 3 schematically illustrates another example functional diagram of a document translation system operating in accordance with one or more aspects of the present disclosure.

FIG. 3 schematically illustrates another example functional diagram of a document translation system 300 operating in accordance with one or more aspects of the present disclosure. In certain implementations, document translation system 300 may comprise one or more computer system 100 of FIG. 1.

As schematically illustrated by FIG. 3, system 300 may comprise one or more I/O interfaces 310, one or more processing modules 320, and one or more supplemental linguistic modules 330. Functional module structure represented by FIG. 3 is intended for illustrative purposes only, while in various implementations the functions corresponding to one or more functional modules of FIG. 3 may be implemented by one or more software modules, one or more firmware modules, one or more hardware devices or any combination thereof.

System 300 may comprise one or more I/O interfaces 310, including a web client 311, a mobile client 312, a scanning device 313, a proxy device 314, and audio streaming device 315, and/or a video streaming device 316.

System 300 may further comprise one or more processing modules 320, including a document processing module 321, a text segmentation module 322, a voice recognition module 323, and OCR module 324, a machine translation module 325, and/or a human translation module 326.

System 300 may further comprise one or more supplemental linguistic modules 330, including one or more glossaries 331 and/or a translation memory database 332.

Translation memory database 332 may comprise a plurality of translation memory records, such that each record comprises a source text fragment in a first natural language and one or more translated text fragments in other natural languages. Thus, the source text fragment may be automatically translated into one or more target languages by retrieving the contents of the database record field corresponding to the target language within the same translation memory database record as the original text fragment. In various illustrative examples, translation memory database 332 may be indexed by one or more fields corresponding to various natural languages.

The contents of translation memory database 332 may be updated with new records and/or existing records may be updated using verified translations of certain texts. Each text fragment stored in translation memory database 332 may comprise one or more sentences. In certain implementations, translation memory database may further comprise additional information reflecting various relationships between portions of a text fragment in the source language and corresponding portions of a corresponding translated text fragment (e.g., sentence-to-sentence or word-for-word relationships, syntactic or semantic information). In various illustrative examples, translation memory database 332 may be associated with a certain account (e.g., an account associated with a user, a project, or an organization), a subject matter, a document type, etc. In certain implementations, translation system 300 may employ two or more translation memory databases 332.

Figure 4:
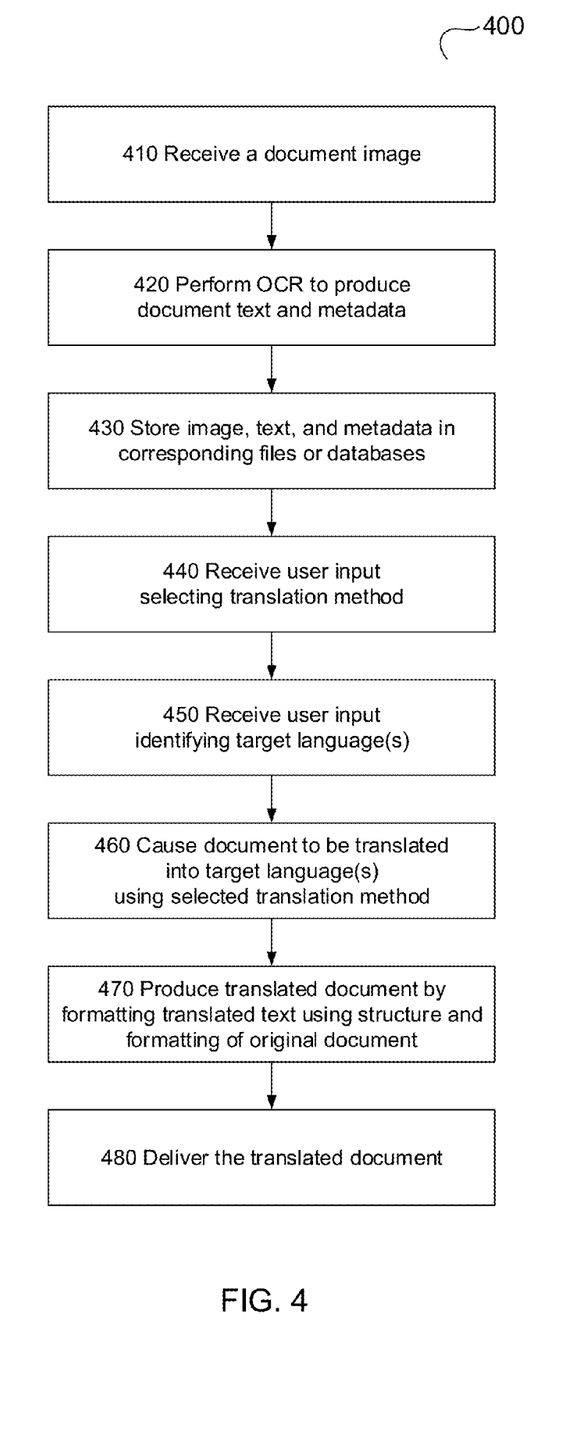
FIG. 4 depicts a flow diagram of an illustrative example of method 400 for processing electronic documents in accordance with the "scan-and-translate" operational scenario with the user-selectable translation method, in accordance with one or more aspects of the present disclosure.

In certain implementations, computer system 100 may implement a "scan-and-translate" operational scenario with the user-selectable translation method. FIG. 4 depicts a flow diagram of an illustrative example of method 400 for processing electronic documents in accordance with the "scan-and-translate" operational scenario with the user-selectable translation method, in accordance with one or more aspects of the present disclosure. Method 400 and/or each of its individual functions, routines, subroutines, or operations may be performed by one or more processors of the computer device (e.g., computer system 100 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

In an illustrative example, the computer system implementing method 400 may be provided by an MFD comprising a document scanner, a document printer, a processor, a memory, various other peripheral devices and/or auxiliary circuitry. Alternatively, the computer system implementing method 400 may be provided by various computing devices including a tablet computer, a smart phone, a notebook computer, a desktop computer, or a cloud-based server. At block 410, the computer system implementing the method may receive an image of at least a part of a document (e.g., a document page). In an illustrative example, the image may be acquired via an imaging device 160 of example the computer system of FIG. 1.

Responsive to acquiring the document image, the computer system may, at block 420, perform an optical character recognition of the image to produce the text and the metadata associated with the scanned document. The document metadata may reflect the original document structure and/or formatting.

At block 430, the computer system may store the acquired image, the document text, and/or the document metadata in one or more local or remote files or databases.

At block 440, the computer system may receive a user input selecting the translation method. The computer system may comprise a user interface employed to receive a user input selecting the desired translation method for the scanned document (e.g., machine translation or human translation). In an illustrative example, the user interface element may be provided by two or more push buttons corresponding to two or more translation methods. Alternatively, the user interface element may be provided by a single push button toggling between a sequence of two or more translation methods. Alternatively, the user interface element may be provided by a radio button rendered by a graphical user interface (GUI) screen which may optionally be equipped with a touch-sensitive input device.

At block 450, the computer system may receive a user input selecting one or more target natural languages. The target natural languages may be selected via a user and/or administrative interfaces of the computer system for the document that is currently being processed or for a plurality of documents grouped based on one or more document attributes, account attributes, etc.

At block 460, the computer system may cause the document to be translated into one or more target natural languages using the user-specified translation method. Responsive to receiving the user's selection of the machine translation method, the computer system may cause the document to be translated into the specified target natural languages using the machine translation method (e.g., by a translation program module which may be running locally on the computer system and/or by communicating, over wired and/or wireless connections, with one or more remote computer systems, such as cloud servers and/or servers residing on the local network). Alternatively, responsive to receiving the user's selection of the human translation method, the computer system may cause the document to be translated into the specified target natural languages using the human translation method (e.g., by transmitting the document text and/or document image, over wired and/or wireless connections, to one or more computer systems, such as cloud servers and/or servers residing on the local network, that are associated with a human translation service).

At block 470, the computer system may produce a translated document, by formatting the translated text using the structure and/or formatting of the originally scanned document.

At block 480, the computer system may deliver the translated document to the user. In an illustrative example, if the machine translation method was used, the computer system may print the translated document (e.g., using the document printer of the MFD). In another illustrative example, if the human translation method was used, the computer system may cause the translated document to be transmitted, over a Single Mail Transfer Protocol (SMTP) relay, to an e-mail address associated with the user. In another illustrative example, the computer system may cause the translated document to be stored in a file system accessible by the user, and notify the user of the file name. In another illustrative example, the computer system may transmit the translated document back to the requesting client device (e.g., a smartphone or a tablet computer).

Responsive to performing the operations described herein above with reference to block 480, the method may terminate.

Figure 5:
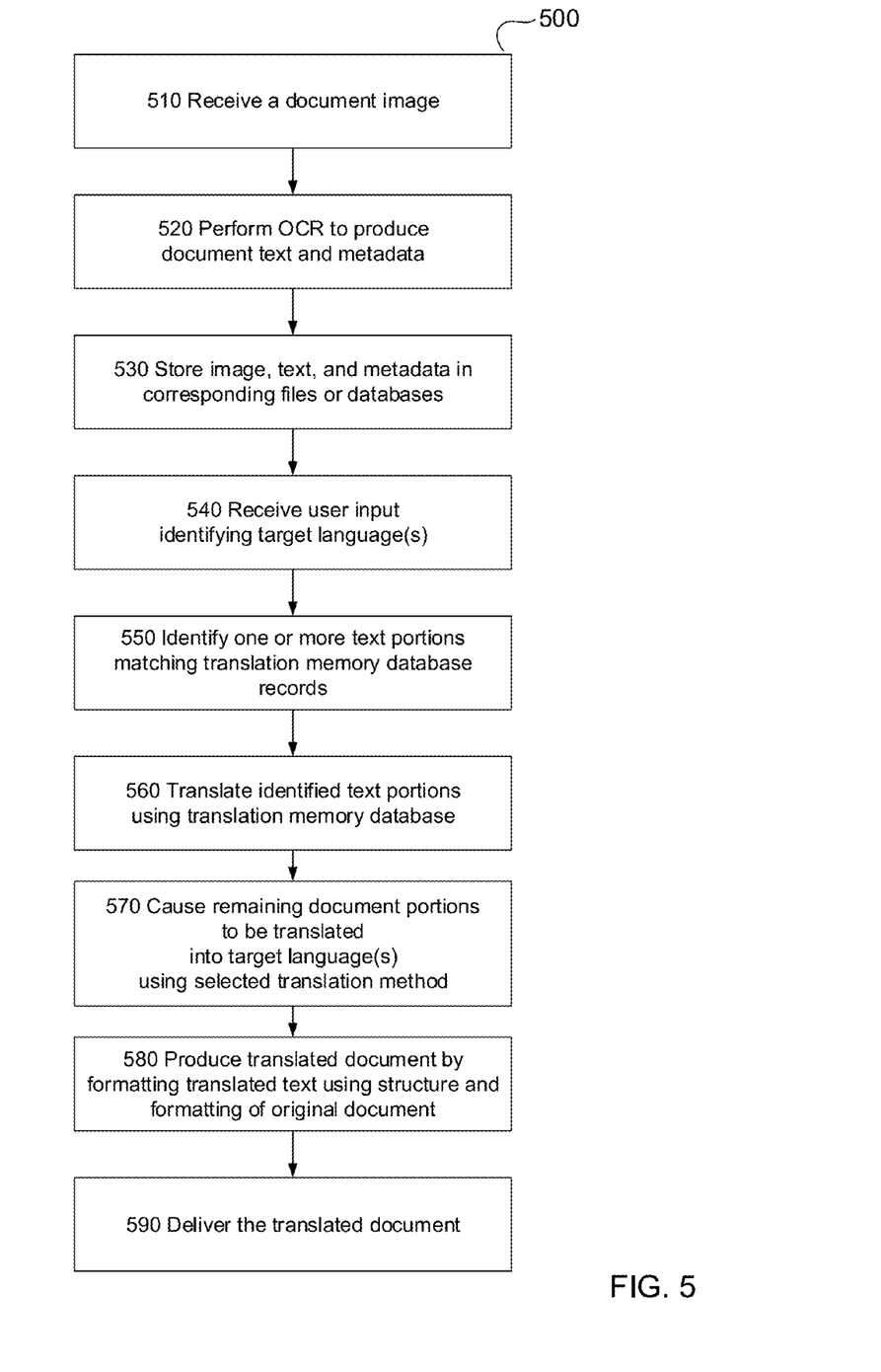
FIG. 5 depicts a flow diagram of one illustrative example of method 500 for processing electronic documents in accordance with the "scan-and-translate" operational scenario using a hybrid translation method that employs a "translation memory" database, in accordance with one or more aspects of the present disclosure.

In certain implementations, computer system 100 may implement a "scan-and-translate" operational scenario with the user-selectable translation method. FIG. 5 depicts a flow diagram of one illustrative example of method 500 for processing electronic documents in accordance with the "scan-and-translate" operational scenario using a hybrid translation method that employs a "translation memory" database, in accordance with one or more aspects of the present disclosure. Method 500 and/or each of its individual functions, routines, subroutines, or operations may be performed by one or more processors of the computer device (e.g., computer system 100 of FIG. 1) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

In an illustrative example, the computer system implementing method 500 may be provided by an MFD comprising a document scanner, a document printer, a processor, a memory, various other peripheral devices and/or auxiliary circuitry. Alternatively, the computer system implementing method 500 may be provided by various computing devices including a tablet computer, a smart phone, a notebook computer, a desktop computer, or a cloud-based server.

At block 510, the computer system implementing the method may receive an image of at least a part of a document (e.g., a document page). In an illustrative example, the image may be acquired via an imaging device 160 of example the computer system of FIG. 1.

Responsive to acquiring the document image, the computer system may, at block 520, perform an optical character recognition of the image to produce the text and the metadata associated with the scanned document. The document metadata may reflect the original document structure and/or formatting.

At block 530, the computer system may store the acquired image, the document text, and/or the document metadata in one or more local or remote files or databases.

At block 540, the computer system may receive a user input selecting one or more target natural languages. The target natural languages may be selected via a user and/or administrative interfaces of the computer system for the document that is currently being processed or for a plurality of documents grouped based on one or more document attributes, account attributes, etc.

At block 550, the computer system may identify, within the document text, one or more text portions that match source text fields of one or more records of translation memory database and glossary (e.g., a translation memory and glossary database 332 of FIG. 3).

At block 560, the computer system may translate the identified text portions using the translation memory database and glossary database. Each identified text portion may be automatically translated using the contents of the database record field corresponding to the target language within the same translation memory database record or glossary record as the original text portion.

At block 570, responsive to failing to match one or more remaining portions of the original document text to any translation memory database records or glossary record, the computer system may cause the remaining document portions to be translated into one or more target natural languages using a user-specified translation method (e.g., machine translation or human translation).

At block 580, the computer system may produce a translated document, by formatting the translated text using the structure and/or formatting of the originally scanned document.

At block 590, the computer system may deliver the translated document to the user. In an illustrative example, if the machine translation method was used, the computer system may print the translated document (e.g., using the document printer of the MFD). In another illustrative example, if the human translation method was used, the computer system may cause the translated document to be transmitted, over a Single Mail Transfer Protocol (SMTP) relay, to an e-mail address associated with the user. In another illustrative example, the computer system may cause the translated document to be stored in a file system accessible by the user, and notify the user of the file name. In another illustrative example, the computer system may transmit the translated document back to the requesting client device (e.g., a smartphone or a tablet computer).

Responsive to performing the operations described herein above with reference to block 590, the method may terminate.

Figure 6:
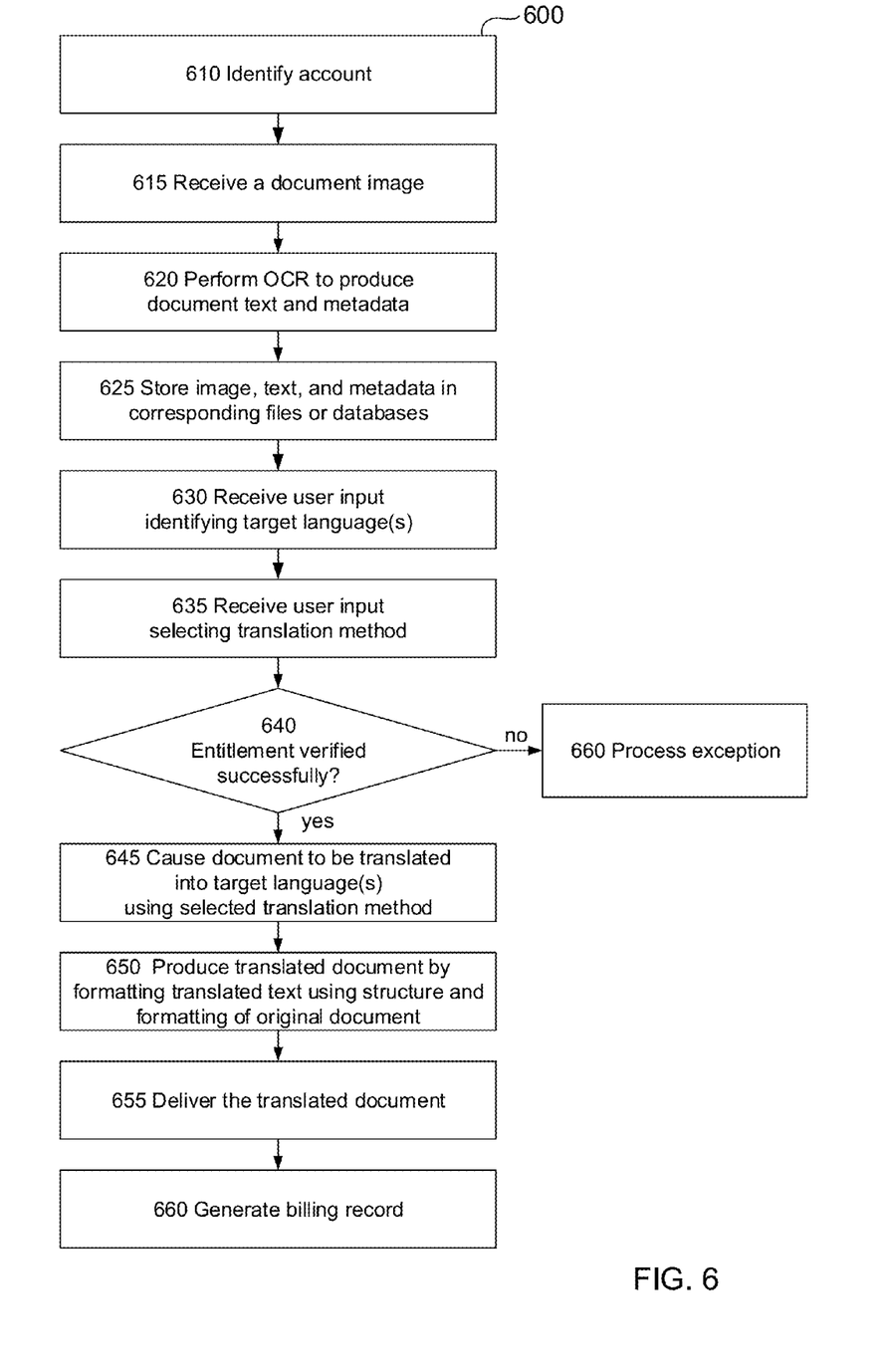
FIG. 6 depicts a flow diagram of one illustrative example of method 600 for processing electronic documents in accordance with the "scan-and-translate" operational scenario with user entitlement verification, in accordance with one or more aspects of the present disclosure.

In certain implementations, computer system 100 may verify the user's entitlement to order a translation of the scanned document. FIG. 6 depicts a flow diagram of one illustrative example of method 600 for processing electronic documents in accordance with the "scan-and-translate" operational scenario with user entitlement verification, in accordance with one or more aspects of the present disclosure. Method 600 and/or each of its individual functions, routines, subroutines, or operations may be performed by one or more processors of the computer device (e.g., computer system 100 of FIG. 1) executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

In an illustrative example, the computer system implementing method 600 may be provided by an MFD comprising a document scanner, a document printer, a processor, a memory, various other peripheral devices and/or auxiliary circuitry. Alternatively, the computer system implementing method 600 may be provided by various computing devices including a tablet computer, a smart phone, a notebook computer, a desktop computer, or a cloud-based server.

At block 610, the computer system implementing the method may identify a certain account (e.g., an account associated with a user, a project, or an organization). In various illustrative examples, the computer system may prompt the user to enter a personal identification number (PIN), a password, a user ID card, or an account identifier. The user input may be accepted via one or more input interfaces, such as an alphanumeric keyboard, a functional keyboard, a touch screen input device, a magnetic or smart card reader, etc.

At block 615, the computer system may receive an image of at least a part of a document (e.g., a document page). In an illustrative example, the image may be acquired via an imaging device 160 of example the computer system of FIG. 1.

Responsive to acquiring the document image, the computer system may, at block 620, perform an optical character recognition of the image to produce the text and the metadata associated with the scanned document. The document metadata may reflect the original document structure and/or formatting.

At block 625, the computer system may store the acquired image, the document text, and/or the document metadata in one or more local or remote files or databases.

At block 630, the computer system may receive a user input selecting one or more target natural languages. The target natural languages may be selected via a user and/or administrative interfaces of the computer system for the document that is currently being processed or for a plurality of documents grouped based on one or more document attributes, account attributes, etc.

At block 635, the computer system may receive a user input selecting the translation method. The computer system may comprise a user interface employed to receive a user input selecting the desired translation method for the scanned document (e.g., machine translation or human translation). In an illustrative example, the user interface element may be provided by two or more push buttons corresponding to two or more translation methods. Alternatively, the user interface element may be provided by a single push button toggling between a sequence of two or more translation methods. Alternatively, the user interface element may be provided by a radio button rendered by a graphical user interface (GUI) screen which may optionally be equipped with a touch-sensitive input device.

At block 640, the computer system may verify the entitlement of the identified account to order the translation job. The computer system may identify certain parameters of the translation job involving the currently scanned document (such parameters including the document size, the source language, the target language, and the translation method). In an illustrative example, the computer system may compare one or more translation job parameters (e.g., document size and the source-target language pair) to corresponding fields of the account's entitlement record stored in an entitlement database. In another illustrative example, the computer system may estimate the price of the translation job and compare the estimated price with the balance of the identified account.

In certain implementations, responsive to determining the price of the translation job, the computer system may output the determined price and other relevant information via the user interface and prompt the user to confirm the order.

In certain implementations, the computer system may estimate the price for the translation job to be performed using various translation methods (e.g., customizable machine translation, human translation, etc.). The computer system may present, via the user interface, the determined prices and other relevant information and prompt the user to select the desired translation method.

Responsive to successfully verifying, at block 640, the account's entitlement to order the translation job, the processing may continue at block 645; otherwise, a corresponding exception may be processed, as schematically illustrated by block 660. The exception processing may include notifying the user of the entitlement verification failure, prompting the user to modify one or more parameters of the translation job (e.g., select another translation method and/or select a portion of the original document for translation), and/or performing other appropriate actions.

At block 645, the computer system may cause the document text to be translated into one or more target natural languages using a user-specified translation method (e.g., machine translation or human translation).

At block 650, the computer system may produce a translated document, by formatting the translated text using the structure and/or formatting of the originally scanned document.

At block 655, the computer system may deliver the translated document to the user. In an illustrative example, if the machine translation method was used, the computer system may print the translated document (e.g., using the document printer of the MFD). In another illustrative example, if the human translation method was used, the computer system may cause the translated document to be transmitted, over a Single Mail Transfer Protocol (SMTP) relay, to an e-mail address associated with the user. In another illustrative example, the computer system may cause the translated document to be stored in a file system accessible by the user, and notify the user of the file name. In another illustrative example, the computer system may transmit the translated document back to the requesting client device (e.g., a smartphone or a tablet computer).

At block 655, the computer system may generate a billing record reflecting the successfully completed translation. The billing record may comprise the account identifier and one or more parameters of the translation job. Such parameters may include the source document file identifier, the source document size, the source language, the target language, and/or the translation method.

Responsive to performing the operations described herein above with reference to block 660, the method may terminate.

Figure 7:
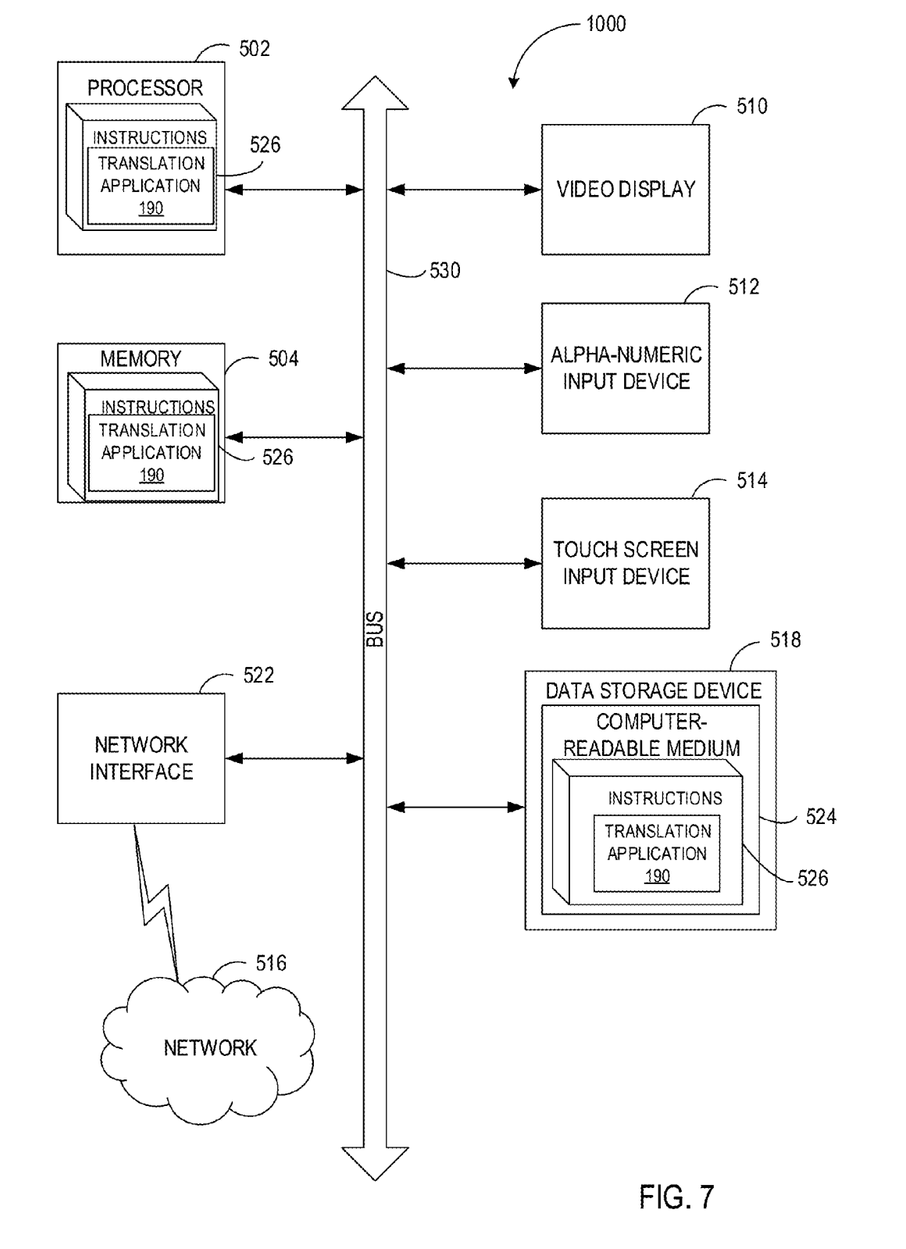
FIG. 7 depicts a more detailed diagram of an illustrative example of a computer system implementing the methods described herein.

FIG. 7 illustrates a more detailed diagram of an example computer system 1000 within which a set of instructions, for causing the computer system to perform any one or more of the methods discussed herein, may be executed. The computer system 1000 may include the same components as computer system 100 of FIG. 1, as well as some additional or different components, some of which may be optional and not necessary to provide aspects of the present disclosure. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the operations and functions discussed herein.

Computer system 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computer system 1000, main memory 504 and processor 502 also constituting computer-readable storage media. Instructions 526 may further be transmitted or received over network 516 via network interface device 522.

In certain implementations, instructions 526 may include instructions of methods 400, 500, and/or 600 for automated document translation from one or more source natural language to one or more target natural languages, and may be performed by application 190 of FIG. 1. While computer-readable storage medium 524 is shown in the example of FIG. 7 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    scanning an image of an original document using a scanner of a multi-function device;
    performing, by a processor, optical character recognition of the image to retrieve a text of the original document;
    identifying, within the text, a first portion expressed in a source natural language, wherein the first portion matches a first stored translation record associating the first portion and a first translated text expressed in a target natural language;
    translating the first portion into the target natural language using the first translated text;
    receiving a user input specifying a translation method selected from a machine translation and a human translation;
    responsive to receiving the user input specifying the translation method, selecting the translation method from among the machine translation and the human translation;
    responsive to failing to match a second portion of the text to a second stored translation record, causing the second portion of the text to be translated into the target natural language using the selected translation method;
    producing a translated document comprising the translations of the first portion and the second portion; and
    printing the translated document using a printer of the multi-function device.

2. The method of claim 1, wherein performing optical character recognition of the image further comprises:
    retrieving, from the original document, metadata comprising at least one of: a document structure of the original document or document formatting of the original document.

3. The method of claim 2, wherein printing the translated document comprises:
    formatting the translated document using the metadata.

4. The method of claim 1, further comprising:
    receiving a user input specifying the target natural language.

5. The method of claim 1, further comprising:
    identifying an account to be associated with a current translation job.

6. The method of claim 5, further comprising:
    verifying an entitlement of the account to order the current translation job.

7. The method of claim 5, further comprising:
    producing a billing record reflecting the current translation job.

8. A method comprising:
    scanning an image of an original document using a scanning device;
    performing, by a processor, optical character recognition of the image to retrieve a text of the original document;
    identifying, within the text, a first portion expressed in a source natural language, wherein the first portion matches a first stored translation record associating the first portion and a first translated text expressed in a target natural language;
    translating the first portion into the target natural language using the first translated text;
    receiving a user input specifying a translation method selected from a machine translation and a human translation;
    responsive to receiving the user input specifying the translation method, selecting the translation method from among the machine translation and the human translation; and
    responsive to failing to match a second portion of the text to a second stored translation record, causing the second portion of the text to be translated into the target natural language using the selected translation method.

9. The method of claim 8, wherein performing optical character recognition of the image further comprises:
    retrieving, from the original document, metadata comprising at least one of: a document structure of the original document or document formatting of the original document.

10. The method of claim 9, further comprising:
    producing a translated document comprising the translations of the first portion and the second portion; and
    printing the translated document using a printer device, wherein printing the translated document comprises formatting the translated document using the metadata.

11. The method of claim 8, further comprising:
    receiving a user input specifying the target natural language.

12. The method of claim 8, further comprising:
    identifying an account to be associated with a current translation job.

13. The method of claim 12, further comprising:
verifying an entitlement of the account to order the current translation job.

14. The method of claim 12, further comprising:
producing a billing record reflecting the current translation job.

15. A method comprising:
identifying an account to be associated with a current translation job;
scanning an image of an original document using a scanning device;
performing, by a processor, optical character recognition of the image to retrieve a text of the original document;
receiving a user input specifying a translation method selected from a machine translation and a human translation;
responsive to receiving the user input specifying the translation method, selecting the translation method from among the machine translation and the human translation;
successfully verifying an entitlement of the account to order the current translation job comprising translation of a first portion and a second portion of the text of the original document to a target natural language, wherein the first portion matches a first stored translation record associating the first portion and a first translated text expressed in a target natural language;
translating the first portion into the target natural language using the first translated text; and
responsive to successfully verifying the entitlement and failing to match the second portion to a second stored translation record, causing the second portion of the text to be translated into the target natural language using the selected translation method.

16. The method of claim 15, wherein performing optical character recognition of the image further comprises:
retrieving, from the original document, metadata comprising at least one of: a document structure of the original document or document formatting of the original document.

17. The method of claim 16, further comprising:
producing a translated document comprising the translations of the first portion and the second portion; and
printing the translated document using a printer device, wherein printing the translated document comprises formatting the translated document using the metadata.

18. The method of claim 15, further comprising:
receiving a user input specifying the target natural language.

19. The method of claim 15, further comprising:
producing a billing record reflecting the current translation job.

20. The method of claim 15, wherein the machine translation is performed using a translation memory database comprising a plurality of records, each record associating a first text fragment in the source natural language and a second text fragment in the target natural language.

21. A non-transitory computer-readable storage medium comprising executable instructions that, when executed by a computer system, cause the computer system to:
scan an image of an original document using a scanner of a multi-function device;
perform, by a processor of the computer system, optical character recognition of the image to retrieve a text of the original document;
identify, within the text, a first portion expressed in a source natural language, wherein the first portion matches a first stored translation record associating the first portion and a first translated text expressed in a target natural language;
translate the first portion into the target natural language using the first translated text;
receive a user input specifying a translation method selected from a machine translation and a human translation;
responsive to receipt of the user input specifying the translation method, select the translation method from among the machine translation and the human translation;
responsive to failure to match a second portion of the text to a second stored translation record, cause the second portion of the text to be translated into the target natural language using the selected translation method;
produce a translated document comprising the translations of the first portion and the second portion; and
print the translated document using a printer of the multi-function device.

22. A non-transitory computer-readable storage medium comprising executable instructions that, when executed by a computer system, cause the computer system to:
scan an image of an original document using a scanning device;
perform, by a processor of the computer system, optical character recognition of the image to retrieve a text of the original document;
identify, within the text, a first portion expressed in a source natural language, wherein the first portion matches a first stored translation record associating the first portion and a first translated text expressed in a target natural language;
translate the first portion into the target natural language using the first translated text;
receive a user input specifying a translation method selected from a machine translation and a human translation;
responsive to receipt of the user input specifying the translation method, select the translation method from among the machine translation and the human translation; and
responsive to failure to match a second portion of the text to a second stored translation record, cause the second portion of the text to be translated into the target natural language using the selected translation method.

23. A non-transitory computer-readable storage medium comprising executable instructions that, when executed by a computer system, cause the computer system to:
identify an account to be associated with a current translation job;
scan an image of an original document using a scanning device;
perform, by a processor of the computer system, optical character recognition of the image to retrieve a text of the original document;
receive a user input specifying a translation method selected from a machine translation and a human translation;
responsive to receipt of the user input specifying the translation method, select the translation method from among the machine translation and the human translation;
successfully verify an entitlement of the account to order the current translation job comprising translation of a first portion and a second portion of the text of the original document to a target natural language, wherein the first portion matches a first stored translation record associating the first portion and a first translated text expressed in a target natural language;

translate the first portion into the target natural language using the first translated text; and responsive to successful verification of the entitlement and failure to match the second portion to a second stored translation record, cause the second portion of the text to be translated into the target natural language using the selected translation method.

* * * * *